(12) United States Patent
Goto

(10) Patent No.: US 11,247,263 B2
(45) Date of Patent: Feb. 15, 2022

(54) METHOD FOR MANUFACTURING RACK BAR

(71) Applicant: NETUREN CO., LTD., Tokyo (JP)

(72) Inventor: Akihiro Goto, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 269 days.

(21) Appl. No.: 16/477,615

(22) PCT Filed: Mar. 14, 2018

(86) PCT No.: PCT/JP2018/010003
§ 371 (c)(1),
(2) Date: Jul. 12, 2019

(87) PCT Pub. No.: WO2018/168938
PCT Pub. Date: Sep. 20, 2018

(65) Prior Publication Data
US 2020/0009643 A1    Jan. 9, 2020

(30) Foreign Application Priority Data

Mar. 16, 2017  (JP) .............................. JP2017-051737

(51) Int. Cl.
*B21K 1/76* (2006.01)
*B23K 37/04* (2006.01)
(Continued)

(52) U.S. Cl.
CPC .......... *B21K 1/768* (2013.01); *B23K 37/0443* (2013.01); *B62D 3/126* (2013.01);
(Continued)

(58) Field of Classification Search
CPC .... B21K 1/767; B21K 1/768; Y10T 29/49474
See application file for complete search history.

(56) References Cited

U.S. PATENT DOCUMENTS

| 4,598,451 | A | * | 7/1986 | Ohki | ...................... | B21K 1/767 |
| | | | | | | 29/893.3 |
| 6,763,739 | B2 | * | 7/2004 | Tsubouchi | ............. | B21K 1/767 |
| | | | | | | 74/422 |

(Continued)

FOREIGN PATENT DOCUMENTS

| EP | 1 215 102 | 6/2002 |
| JP | 10-85893 | 4/1998 |

(Continued)

OTHER PUBLICATIONS

International Search Report and Written Opinion of the International Searching Authority, dated Jul. 2, 2018 in corresponding International Application No. PCT/JP2018/010003.

*Primary Examiner* — Sarang Afzali
(74) *Attorney, Agent, or Firm* — Wenderoth, Lind & Ponack, L.L.P.

(57) ABSTRACT

A method for manufacturing a rack bar having a first rack and a second rack is provided. The first and second racks have an angular positional difference around an axis of the rack bar. The method includes forming a first flat surface and a second flat surface on an outer circumference of a single hollow shaft member, with the angular positional difference being provided between the first and second flat surfaces, and forming the first rack on the first flat surface and the second rack on the second rack surface by press-fitting one or more mandrels into the hollow shaft member in a state in which one or more teeth dies corresponding to the first rack and the second rack is pressed against the first flat surface and the second flat surface.

2 Claims, 16 Drawing Sheets

(51) Int. Cl.
  *B62D 3/12* (2006.01)
  *F16H 55/26* (2006.01)
  *B62D 5/04* (2006.01)

(52) U.S. Cl.
  CPC ........... *F16H 55/26* (2013.01); *B62D 5/0442* (2013.01); *Y10T 29/49474* (2015.01)

(56) References Cited

U.S. PATENT DOCUMENTS

| | | | |
|---|---|---|---|
| 6,925,899 B2 * | 8/2005 | Ozeki | .................... B21K 1/767 74/109 |
| 2002/0073793 A1 | 6/2002 | Tsubouchi et al. | |
| 2003/0213321 A1 | 11/2003 | Tsubouchi et al. | |
| 2007/0204668 A1 * | 9/2007 | Shiokawa | ............... B21K 1/768 72/370.15 |
| 2016/0116049 A1 | 4/2016 | Yamawaki et al. | |
| 2016/0271726 A1 | 9/2016 | Suzuki et al. | |
| 2017/0100796 A1 | 4/2017 | Suzuki et al. | |
| 2018/0223981 A1 | 8/2018 | Yamawaki et al. | |

FOREIGN PATENT DOCUMENTS

| | | |
|---|---|---|
| JP | 2000-247244 | 9/2000 |
| JP | 2002-178094 | 6/2002 |
| JP | 2007-275896 | 10/2007 |
| JP | 2014-124767 | 7/2014 |
| JP | 2014-234882 | 12/2014 |

* cited by examiner

METHOD FOR MANUFACTURING RACK BAR

This application claims priority to Japanese Patent Application No. 2017-051737 filed on Mar. 16, 2017, the entire contents of which are incorporated herein by reference.

TECHNICAL FIELD

The present invention relates to a method for manufacturing a rack bar to be used in a rack-and-pinion steering apparatus of a vehicle.

BACKGROUND ART

A related art rack bar is a dual-pinion rack bar to be used in a steering apparatus of a vehicle such as an automobile. A dual-pinion rack bar has racks at two locations, one rack being provided to engage with a steering pinion of a steering shaft, and the other rack being provided to engage with an auxiliary pinion of an assist mechanism. The dual-pinion rack bar may be made from one solid shaft member, or by joining a hollow first shaft member and a solid or hollow second shaft member (see, e.g., JP2014-124767A and JP2014-234882A).

Depending on a positional relationship between a steering shaft and an assist mechanism in a vehicle, racks may be provided at two locations having different angular positions around an axis of a rack bar. When manufacturing a rack bar from one solid shaft member, racks may be formed at two locations having different angular positions by, for example, NC cutting.

JP2014-124767A discloses a rack bar formed by joining a hollow first shaft member and a solid second shaft member. The first shaft member and the second shaft member may each have a rack formed in advance, and are coaxially disposed in a state in which their end faces are butted against each other, and the first shaft member and the second shaft member are rotated relative to each other for friction pressure welding. The relative rotation of the first shaft member and the second shaft member is stopped such that a desired angular positional difference is provided between the respective racks of the first shaft member and the second shaft member.

JP2014-234882A discloses a rack bar formed by joining a hollow first shaft member and a hollow second shaft member. The first shaft member and the second shaft member may each have a rack formed in advance, and are coaxially disposed at respective sides of a joint member in a state in which they have a desired angular positional difference. The joint member is then rotated so that the first shaft member and the joint member, and the second shaft member and the joint member, are frictionally pressure-welded to each other. By rotating the joint member while holding the first shaft member and the second shaft member in a stationary manner, the accuracy of the angular positional difference between the respective racks of the first shaft member and the second shaft member is improved.

Making at least a portion of the shaft member hollow can reduce the weight of the resulting rack bar. However, with the related art rack bar manufacturing method described above, additional steps of joining of the first shaft member and the second shaft member and finishing the joined portion are needed, and it is also necessary to ensure joining strength.

SUMMARY OF INVENTION

Illustrative aspects of the present invention provide a method for manufacturing a light-weight rack bar with improved productivity.

According to an illustrative aspect of the present invention, a method for manufacturing a rack bar having a first rack and a second rack is provided. The first and second racks are provided away from each other in an axial direction, with an angular positional difference around an axis of the rack bar being provided between the first and second racks. The method includes forming a first flat surface extending in the axial direction on an outer circumference of a first end portion of a single hollow shaft member, forming a second flat surface extending in the axial direction on an outer circumference of a second end portion of the hollow shaft member at a location having the angular positional difference with respect to the first flat surface, forming the first rack by press-fitting a mandrel into the hollow shaft member through a first opening of the hollow shaft member on a side of the first end portion of the hollow shaft member in a state in which a teeth die corresponding to the first rack is pressed against the first flat surface to cause a material of the hollow shaft member at the first flat surface to plastically deform toward the teeth die, and forming the second rack by press-fitting the same mandrel or a different mandrel into the hollow shaft member through a second opening of the hollow shaft member on a side of the second end portion of the hollow shaft member in a state in which the same teeth die or a different teeth die corresponding to the second rack is pressed against the second flat surface to cause a material of the hollow shaft member at the second flat surface to plastically deform toward the same teeth die or the different teeth die.

DESCRIPTION OF EMBODIMENTS

Figure 1:
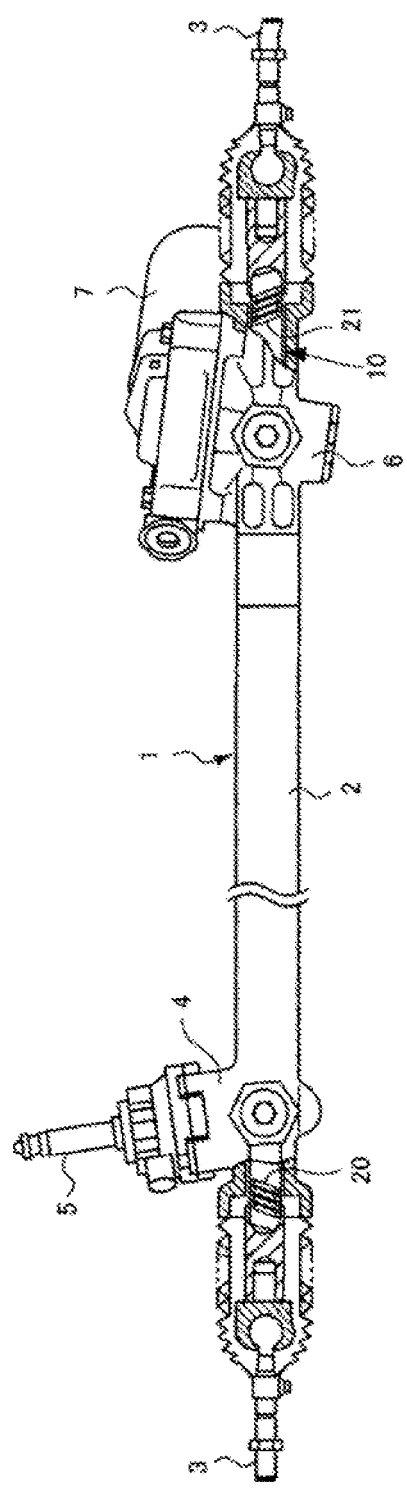
FIG. 1 is a front view of an example of a steering apparatus.

Hereinafter, embodiments of the present invention will be described in detail with reference to the drawings. FIG. 1 illustrates an example of a steering apparatus 1.

The steering apparatus 1 includes a rack housing 2, and a rack bar 10 housed inside the rack housing 2 so as to be slidable in an axial direction.

Tie rods 3 are joined to respective ends of the rack bar 10 via joints, and in accordance with a movement of the rack bar 10, wheels of a vehicle are turned via the tie rods 3 and a turning mechanism to which the tie rods 3 are joined.

A steering gear box 4 is provided at one axial end portion of the rack housing 2. A steering pinion (not shown) formed on an input shaft 5 to be joined to a steering shaft is housed inside the steering gear box 4. An auxiliary gear box 6 is provided at the other axial end portion of the rack housing 2. An auxiliary pinion (not shown) to be driven by a motor 7 of an assist mechanism is housed inside the auxiliary gear box 6.

On the rack bar 10, a first rack 20 having a plurality of rack teeth configured to engage with the steering pinion, and a second rack 21 having a plurality of rack teeth configured to engage with the auxiliary pinion are formed.

In response to a turning operation of the steering wheel, the steering pinion of the input shaft 5 is turned, and the rack bar 10 engaging with the steering pinion by the first rack 20 is moved in the axial direction. Then, a driving force of the motor 7 of the assist mechanism that is controlled according to a steering force of the steering wheel, etc., is transmitted to the rack bar 10 via the auxiliary pinion engaging with the second rack 21, and the movement of the rack bar 10 according to a turning operation of the steering wheel is assisted.

Figure 2:
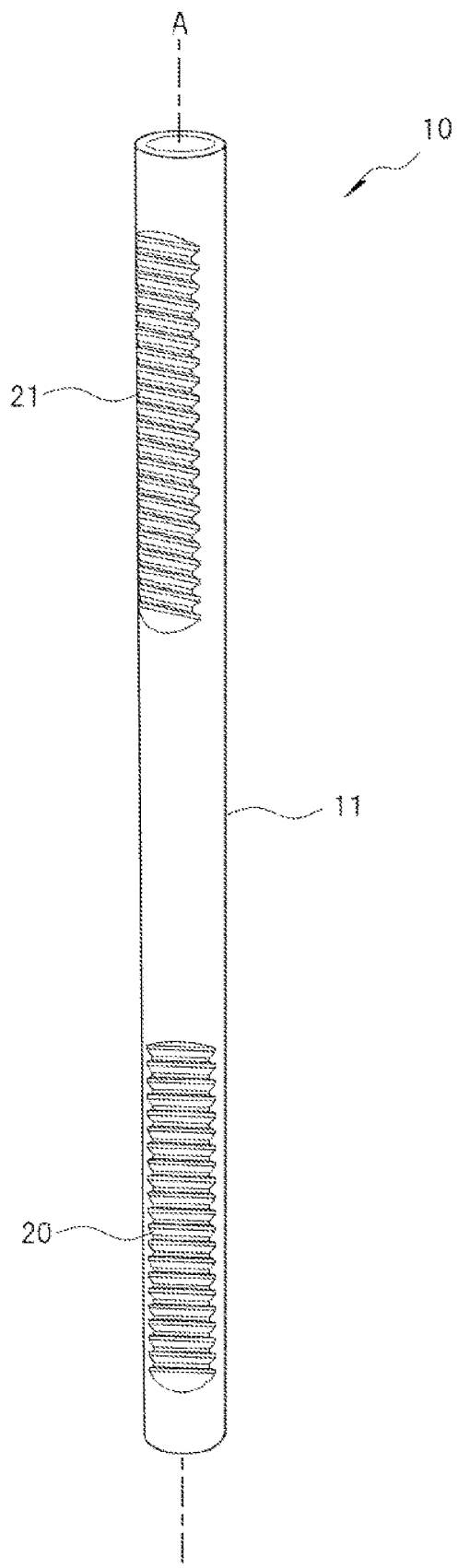
FIG. 2 is a perspective view of a rack bar of the steering apparatus of FIG. 1.

FIG. 2 illustrates the rack bar 10.

The rack bar 10 is formed by using a single hollow shaft member 11 having a circular section made of a metal material such as carbon steel, for example, JIS-S45C. At one axial end portion (hereinafter, a first end portion) of the shaft member 11, the first rack 20 having rack teeth configured to engage with the steering pinion is provided, and at the other axial end portion (hereinafter, a second end portion) of the shaft member 11, the second rack 21 having rack teeth configured to engage with the auxiliary pinion is provided.

The first rack 20 and the second rack 21 are provided away from each other in the axial direction of the shaft member 11, and an angular positional difference around the center axis A of the shaft member 11 is provided between the first rack 20 and the second rack 21. This angular positional difference around the center axis A between the first rack 20 and the second rack 21 is not specifically limited, and may be in the range of, for example, 0° to 90°. The teeth profile of the respective rack teeth of the first rack 20 and the second rack 21 may be the same or different from each other. In the example shown in the drawings, both of the first rack 20 and the second rack 21 have a constant gear ratio (CGR) meaning that the rack teeth pitch is constant, however, they may have a variable gear ratio (VGR) meaning that the pitch varies in the axial direction. Also, the directions of rack teeth (tooth width direction) of the respective first rack 20 and second rack 21 are all perpendicular to the axial direction of the shaft member 11, however, the directions may be diagonal to the axial direction of the shaft member 11.

The rack bar 10 is manufactured in a following manner.

First, an axial end portion of a single hollow shaft member 11 having a circular section is pressed and flattened by press working, and a flat surface extending in the axial direction of the shaft member 11 is formed on an outer surface of the axial end portion of the shaft member 11. This preliminary molding is applied to each of the first end portion and the second end portion of the shaft member 11, and accordingly, a first flat surface corresponding to the first rack 20 and a second flat surface corresponding to the second rack 21 are formed.

Next, a teeth die is pressed against the flat surface, and in a state in which the teeth die is pressed against the flat surface, a mandrel is press-fitted into the shaft member. By press-fitting the mandrel into the shaft member, the material of the shaft member at the flat surface of the shaft member is plastically deformed by the mandrel and enters into the teeth die. Press-fitting of the mandrel is repeated with the mandrel being replaced with a larger one each time, so that the profile of the teeth die is transferred and rack teeth are formed on the flat surface. This teeth forming is performed for each of the first end portion and the second end portion of the shaft member 11 to form the first rack 20 and the second rack 21.

Figure 3:
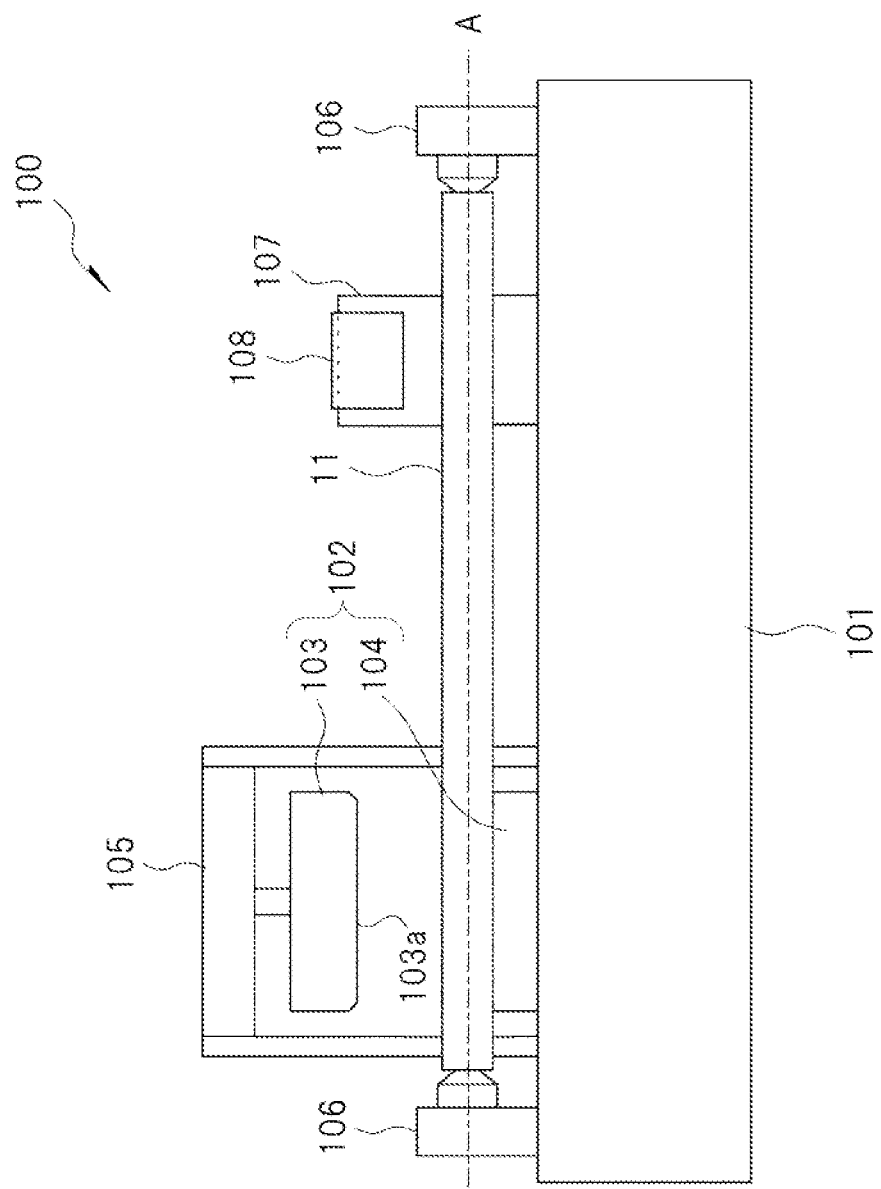
FIG. 3 is a front view of an example of a press machine to be used in manufacturing the rack bar of FIG. 2.

FIG. 3 illustrates an example of a press machine to be used for preliminary molding of the shaft member 11.

A press machine 100 includes a base 101, a press die 102 having a movable die 103 and a fixed die 104 facing each other, a drive unit 105 to move the movable die 103 in a direction facing the fixed die 104 (hereinafter, an up-down direction), and a pair of chucks 106 that removably holds the shaft member 11.

The pair of chucks 106 are disposed on the same line, and in a state in which the same line on which the pair of chucks 106 are disposed matches a center axis A of the shaft member 11, the shaft member 11 is held rotatably around the center axis A by the pair of chucks 106. One axial end portion of the shaft member 11 held by the pair of chucks 106 is placed on the fixed die 104.

First Preliminary Molding

Figure 4:
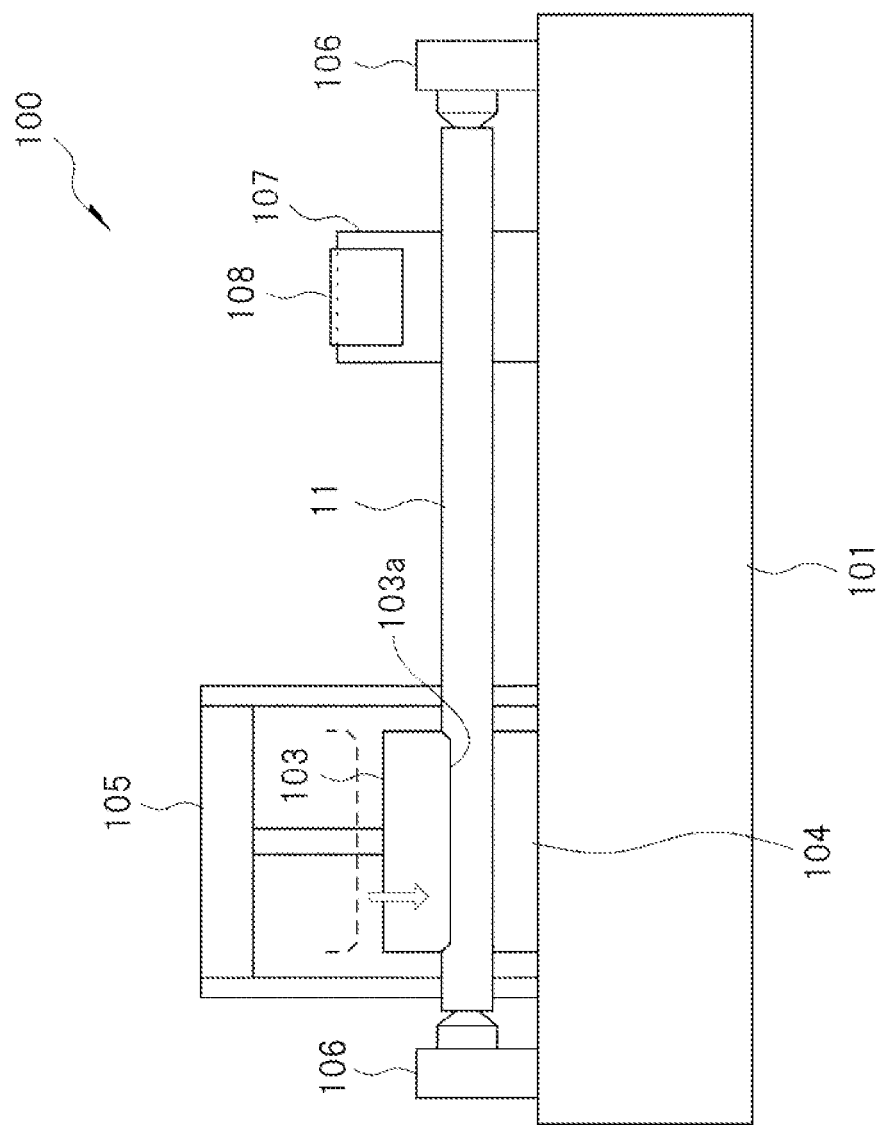
FIG. 4 is another front view of the press machine of FIG. 3, illustrating a preliminary molding of a shaft member.
Figure 5:
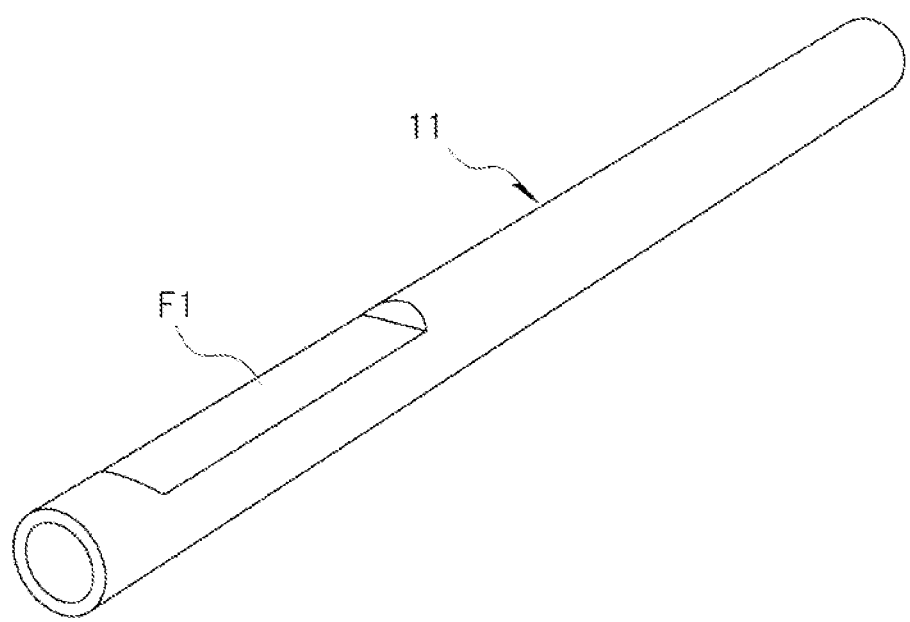
FIG. 5 is a perspective view of the preliminary molded shaft member.

First, as shown in FIG. 4, the first end portion of the shaft member 11 is placed on the fixed die 104. The first end portion of the shaft member 11 placed on the fixed die 104 comes into contact with a flat molding surface 103a of the movable die 103 by lowering the movable die 103, and a portion of the first end portion of the shaft member 11 contacting the molding surface 103a is pressed and flattened. Accordingly, as shown in FIG. 5, a first flat surface F1 is formed on the outer surface of the first end portion of the shaft member 11.

Second Preliminary Molding

Figure 6:
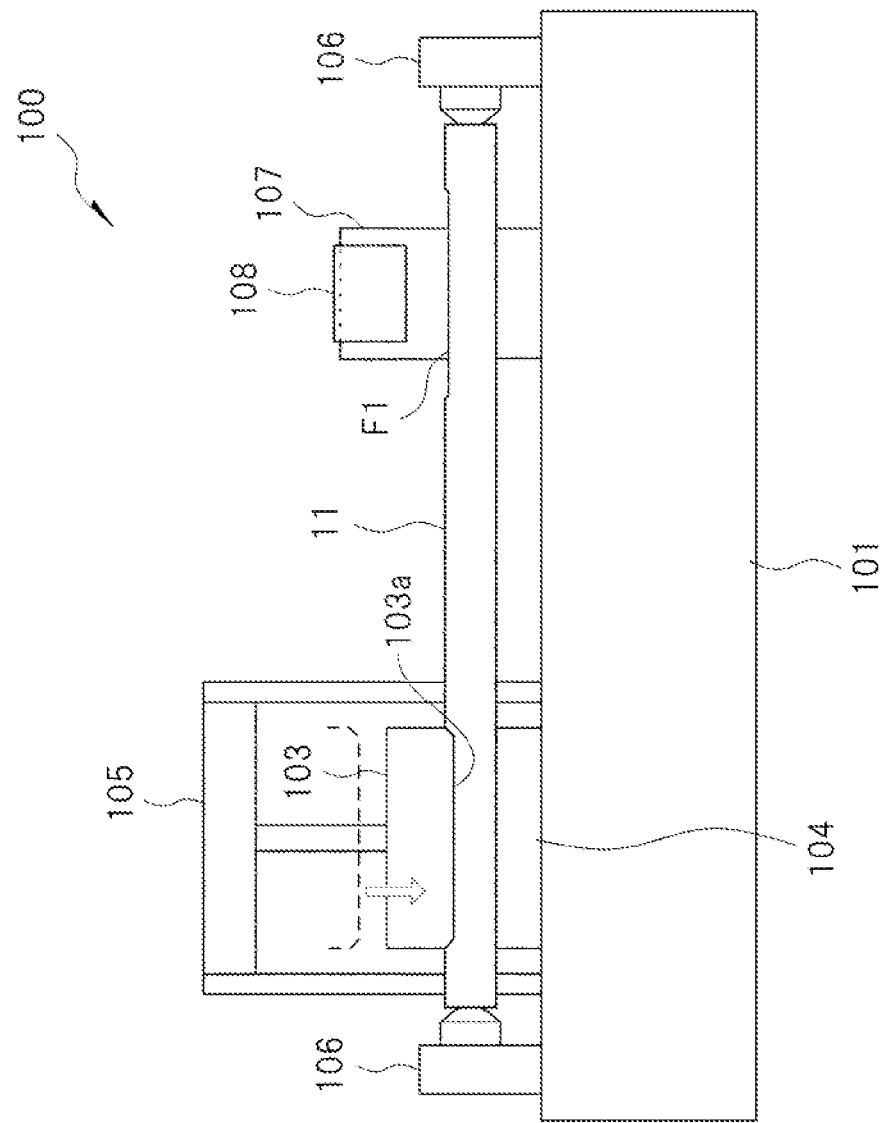
FIG. 6 is another front view of the press machine, illustrating the preliminary molding of the shaft member.
Figure 7:
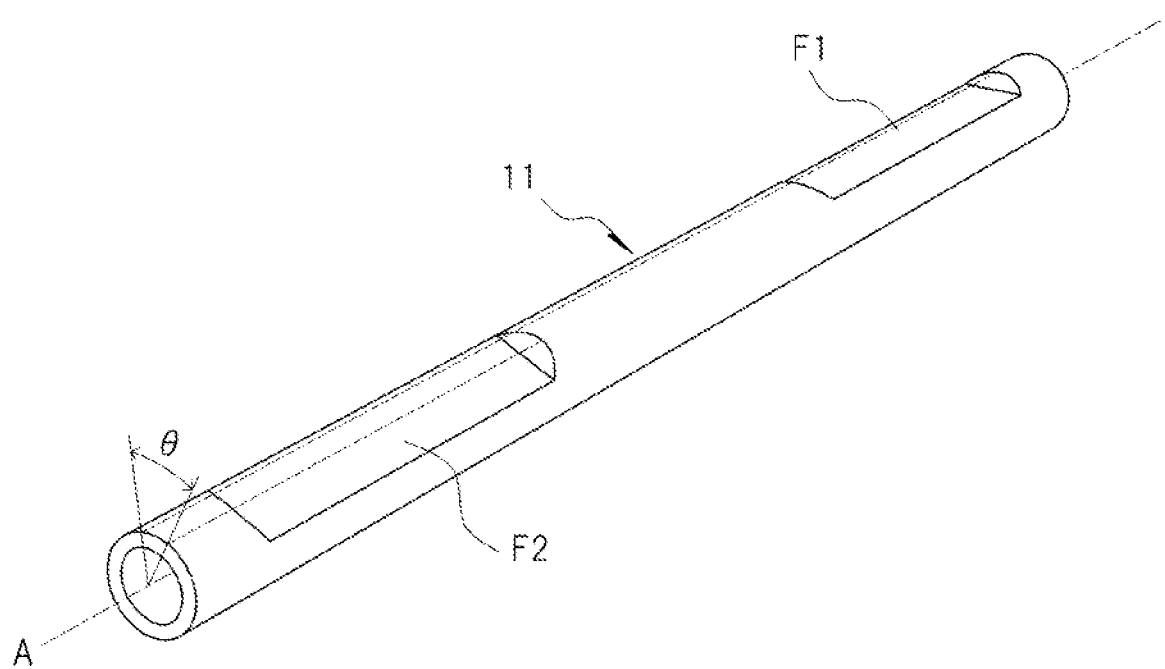
FIG. 7 is another perspective view of the preliminary molded shaft member.

Subsequently, as shown in FIG. 6, the shaft member 11 is temporarily removed from the pair of chucks 106, and the second end portion of the shaft member 11 is placed on the fixed die 104. In the same manner as in the first preliminary molding step, a portion of the second end portion of the shaft member 11 contacting the molding surface 103a of the movable die 103 is pressed and flattened. Thereby, as shown in FIG. 7, a second flat surface F2 is formed on the outer surface of the second end portion of the shaft member 11.

The second flat surface F2 is formed at a position at a rotation angle θ around the center axis A of the shaft member 11 with respect to the first flat surface F1. This rotation angle θ is equivalent to the angular positional difference set between the first rack 20 and the second rack 21 of the rack bar 10, and is obtained by using a jig.

Figure 8:
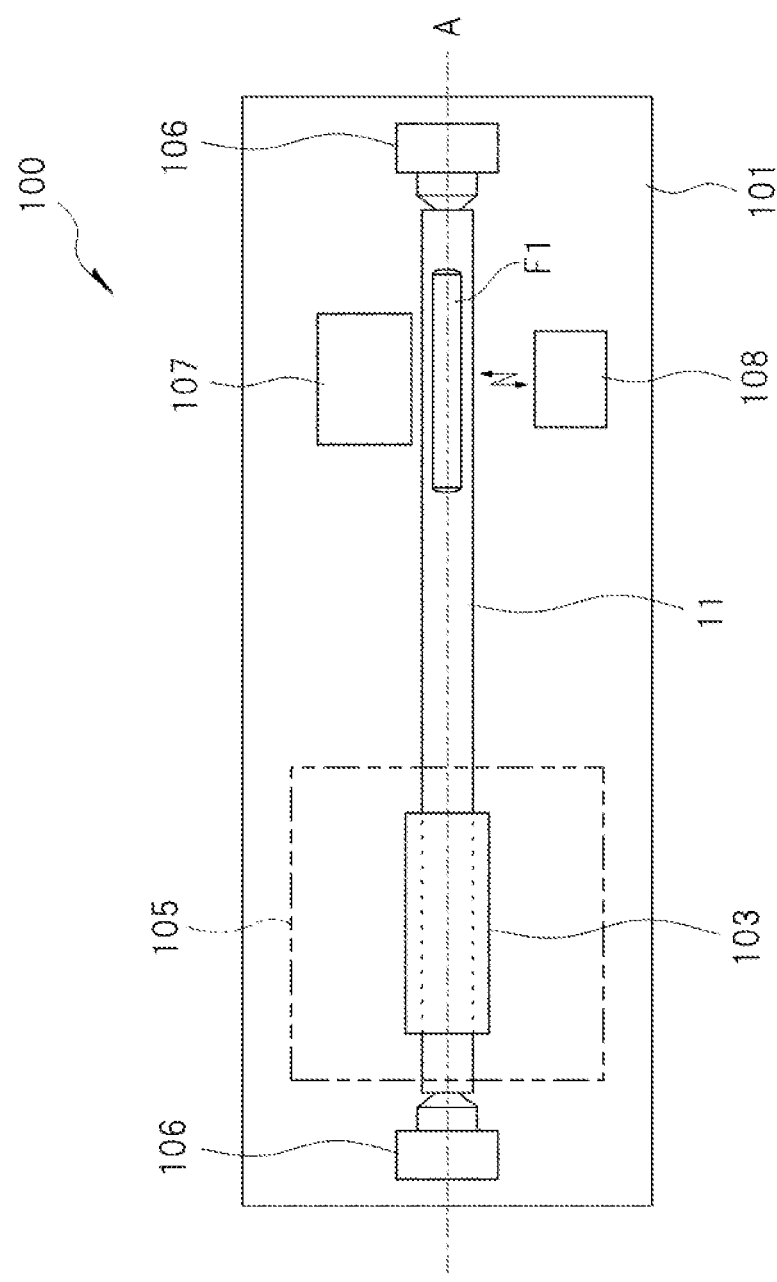
FIG. 8 is a plan view of a portion of the press machine.
Figure 9:
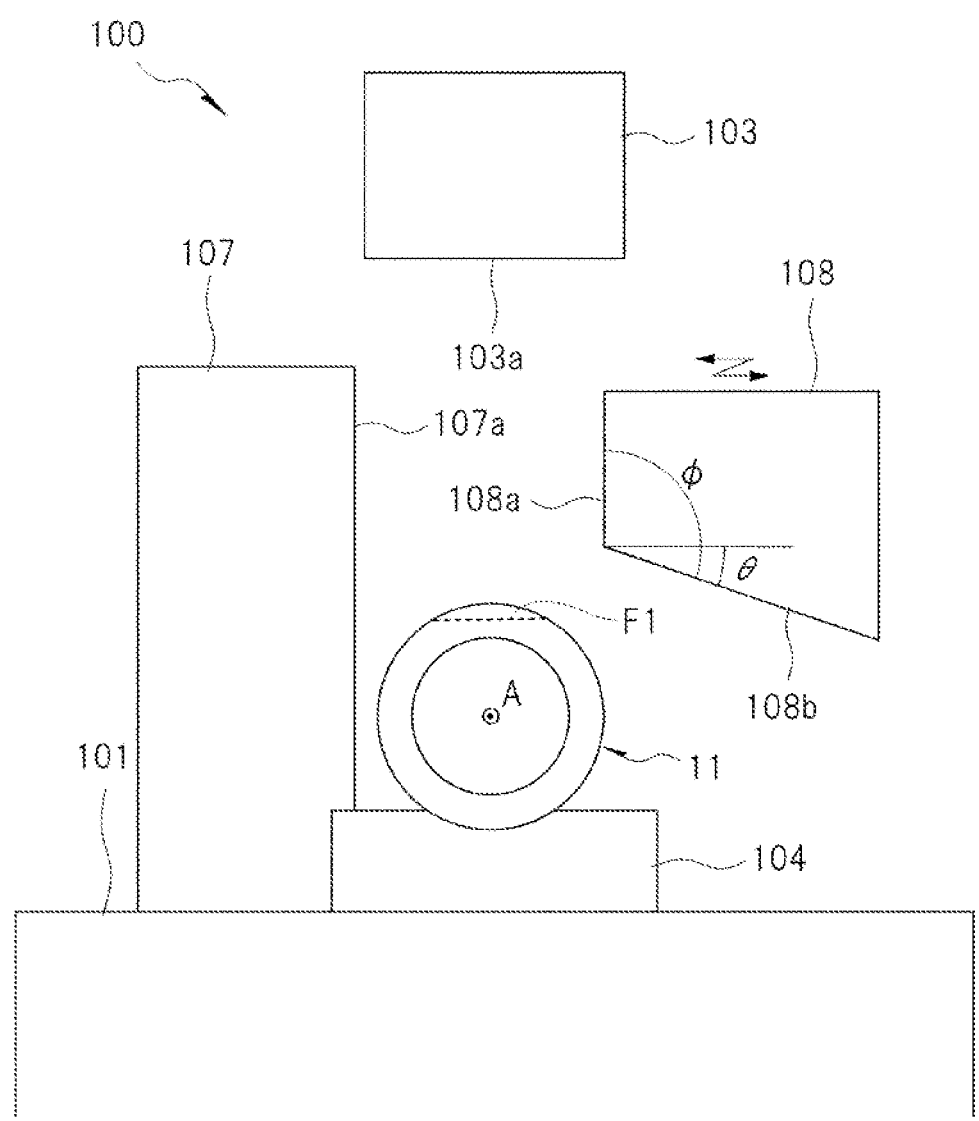
FIG. 9 is a side view of a portion of the press machine.

FIG. 8 and FIG. 9 illustrate a portion of the press machine 100.

The press machine 100 further includes the jig to set the angular positional difference θ between the first flat surface F1 and the second flat surface F2. The jig includes a first jig 107 and a second jig 108.

The first jig 107 is installed at a predetermined position on the base 101, and a positional relationship between the press die 102 that is also installed on the same base 101 and the first jig 107 is fixed. Then, in the second preliminary molding step, in a state in which the second end portion of the shaft member 11 is placed on the fixed die 104 of the press die 102, the first jig 107 is disposed lateral to the first end portion of the shaft member 11. This first jig 107 has a reference surface 107a disposed perpendicular to the molding surface 103a of the movable die 103.

The second jig 108 is configured to be separable from the first jig 107, and includes a contact surface 108a with which the reference surface 107a of the first jig 107 comes into contact, and a positioning surface 108b with which the first flat surface F1 of the shaft member 11 comes into contact. An angle φ between the contact surface 108a and the positioning surface 108b is set to 90'+0.

Figure 10:
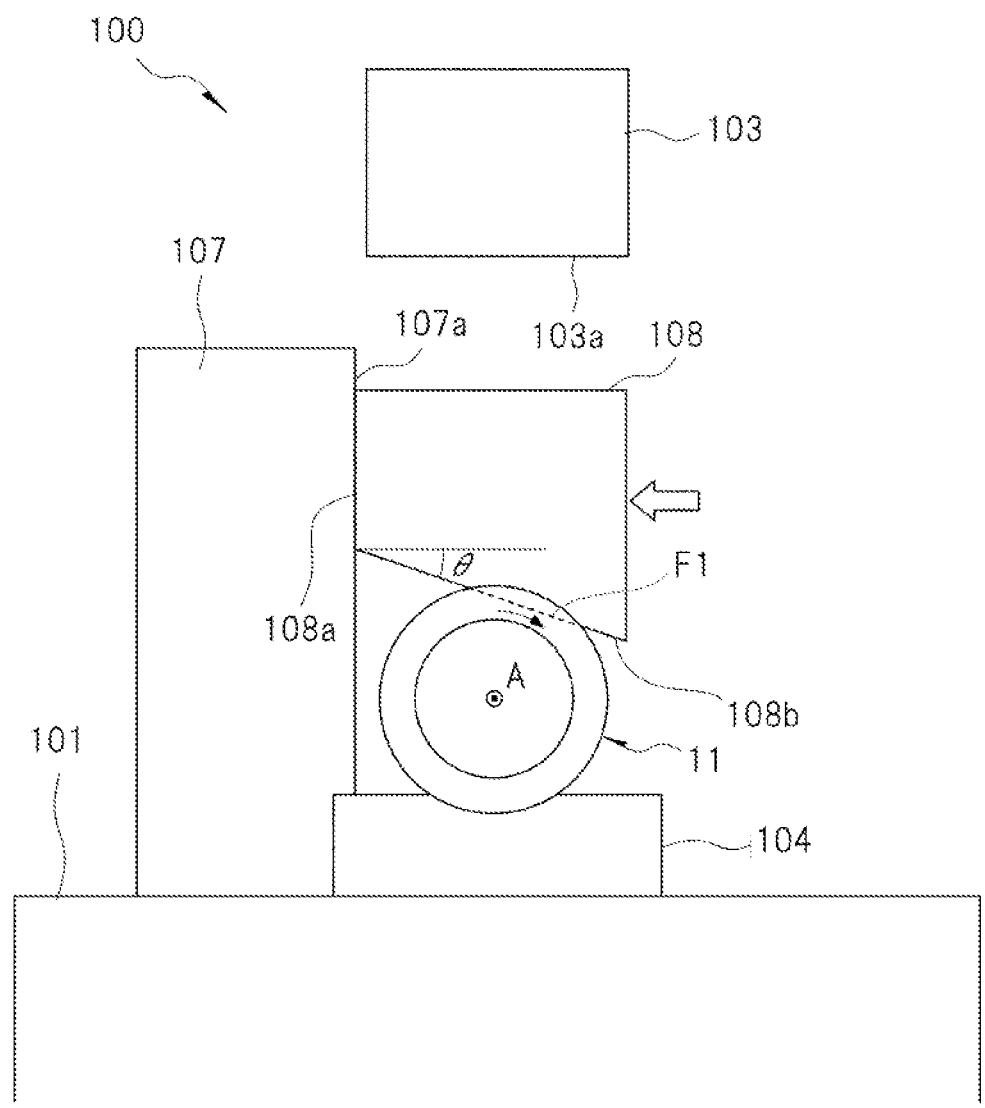
FIG. 10 is another side view of the portion of the press machine, illustrating the preliminary molding of the shaft member.

FIG. 10 illustrates how an angular position of the second flat surface F2 with respect to the first flat surface F1 is set using the first jig 107 and the second jig 108.

In the second preliminary molding step, in a state in which the second end portion of the shaft member 11 is placed on the fixed die 104, and the shaft member 11 is held by the pair of chucks 106, the contact surface 108a of the second jig 108 is brought into contact with the reference surface 107a of the first jig 107 disposed lateral to the first end portion of the shaft member 11. In a state in which the contact surface 108a is in contact with the reference surface 107a, the second jig 108 is disposed above the shaft member 11, and the positioning surface 108b of the second jig 108 is inclined by the angle θ with respect to the molding surface 103a of the movable die 103, and disposed to face the shaft member 11.

Then, the second jig 108 is moved along the reference surface 107a of the first jig 107 toward the shaft member 11, the shaft member 11 is rotated around the center axis A, and the positioning surface 108b of the second jig 108 and the first flat surface F1 of the shaft member 11 are brought into contact with each other parallel to each other. The positioning surface 108b of the second jig 108 is disposed so as to be inclined by the angle θ with respect to the molding surface 103a of the movable die 103, and the first flat surface F1 of the shaft member 11 with which the positioning surface 108b is in contact, is also disposed so as to be inclined by the angle θ with respect to the molding surface 103a.

In a state in which the first flat surface F1 of the shaft member 11 is arranged to be inclined by the angle θ with respect to the molding surface 103a of the movable die 103, for example, by locking the pair of chucks 106, rotation of the shaft member 11 is blocked, and the shaft member 11 is positioned. Then, the second preliminary molding step described above is performed for the positioned shaft member 11, and accordingly, the second flat surface F2 is formed on the outer surface of the second end portion of the shaft member 11.

The second flat surface F2 formed on the second end portion of the shaft member 11 becomes parallel to the molding surface 103a of the movable die 103, and on the other hand, the first flat surface F1 formed on the first end portion of the shaft member 11 is arranged to be inclined by the angle θ with respect to the molding surface 103a, therefore, the angular positional difference θ is set between the first flat surface F1 and the second flat surface F2.

Thus, with use of the jig having the positioning surface 108b arranged to be inclined by the angle θ with respect to the molding surface 103a of the press die 102, by positioning the shaft member 11 by bringing the positioning surface 108b of the jig into contact with the first flat surface F1 in the second preliminary molding step described above, for example, as compared with the case where the rotation angles of the pair of chucks 106 are detected by encoders and then the shaft member 11 is positioned, the angular positional difference θ between the first flat surface F1 and the second flat surface F2 can be easily and highly accurately set.

Further, since the jig is divided into the first jig 107 to be fixed to a lateral position of the shaft member 11 and the second jig 108 configured to be separable from the first jig 107, and the positioning surface 108b is provided on the second jig 108, when the shaft member 11 is fitted to the pair of chucks 106 in the first preliminary molding step and the second preliminary molding step described above, by retreating the second jig 108, the shaft member 11 can be easily fitted to the pair of chucks 106, and when the shaft member 11 is positioned in the second preliminary molding step described above, by bringing the second jig 108 into contact with the fixed first jig 107, the inclination angle θ of the positioning surface 108b with respect to the molding surface 103a can be easily and highly accurately reproduced.

Next, teeth forming on the shaft member 11 is described.

Figure 11:
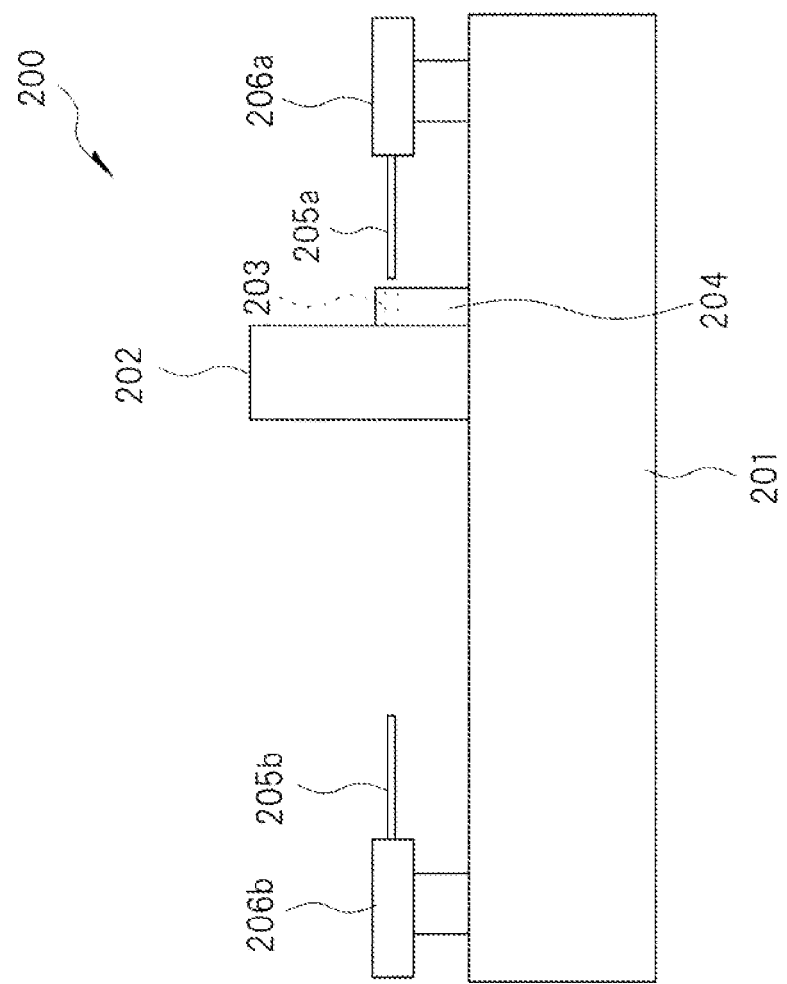
FIG. 11 is a front view of a teeth forming machine to be used in manufacturing the rack bar of FIG. 2.
Figure 12:
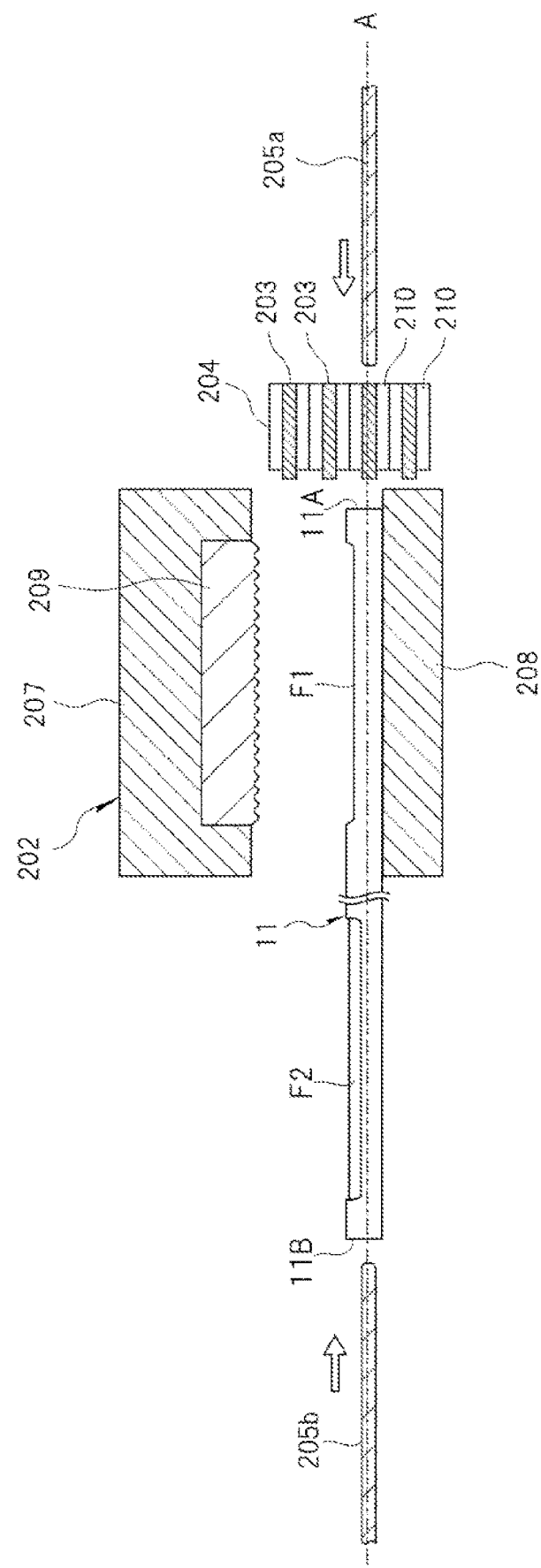
FIG. 12 is an enlarged view of a portion of the teeth forming machine of FIG. 11.

FIG. 11 and FIG. 12 illustrate an example of a teeth forming machine to be used for forming teeth on the shaft member 11.

A teeth forming machine 200 includes a base 201, a die 202, a plurality of mandrels 203 to be inserted into the shaft member 11, a mandrel holder 204 holding the plurality of mandrels 203, a first push rod 205a and a second push rod 205b to push the mandrels 203, and a first drive unit 206a that drives the first push rod 205a and a second drive unit 206b that drives the second push rod 205b. The mandrel holder 204, the first push rod 205a, and the first drive unit 206a are disposed on the opposite side of the second push rod 205b and the second drive unit 206b across the die 202.

The die 202 includes an upper die 207 and a lower die 208. The upper die 207 is moved in the up-down direction by a mold clamping mechanism not shown in the drawings, and the shaft member 11 is sandwiched by the upper die 207 and the lower die 208. A teeth die 209 is removably fitted to the upper die 207, and the teeth die 209 has a molding surface formed into a teeth shape corresponding to rack teeth to be formed on the shaft member 11.

The mandrel holder 204 has a plurality of holding chambers 210 penetrating through the mandrel holder 204 parallel to the axial direction of the shaft member 11 held by the die 202, and in each holding chamber 210, the mandrel 203 is housed. The plurality of mandrels 203 held by the mandrel holder 204 have sizes (outer diameters) different from each other. The mandrel holder 204 is rotary-driven by a holder drive unit not shown in the drawings. Each time the mandrel holder 204 is rotary-driven, one of the plurality of holding chambers 210 is disposed on the center axis A of the shaft member 11 held by the die 202.

The first push rod 205a sandwiches the mandrel holder 204 with the die 202, and is disposed on the center axis A of the shaft member 11 held by the die 202. When the first push rod 205a is driven by the first drive unit 206a, the first push rod 205a and the mandrel 203 housed in one holding chamber 210 disposed on the center axis A of the shaft member 11 among the plurality of holding chambers 210 of the mandrel holder 204 are inserted into the shaft member 11 through an end opening on one side in the axial direction of the shaft member 11.

The second push rod 205b is disposed on the center axis A of the shaft member 11 held by the die 202, on the opposite side of the first push rod 205a across the die 202. When the second push rod 205b is driven by the second drive unit 206b, the second push rod 205b is inserted into the shaft member 11 through an end opening on the other side in the axial direction of the shaft member 11.

In the description below, an end opening on the first end portion side of the shaft member 11 on which the first flat surface F1 is formed is referred to as a first end opening 11A, and an end opening on the second end portion side of the shaft member 11 on which the second flat surface F2 is formed is referred to as a second end opening 11B.

FIG. 13 to FIG. 16 illustrate steps of teeth forming using the teeth forming machine 200.

First Teeth Forming

Figure 13:
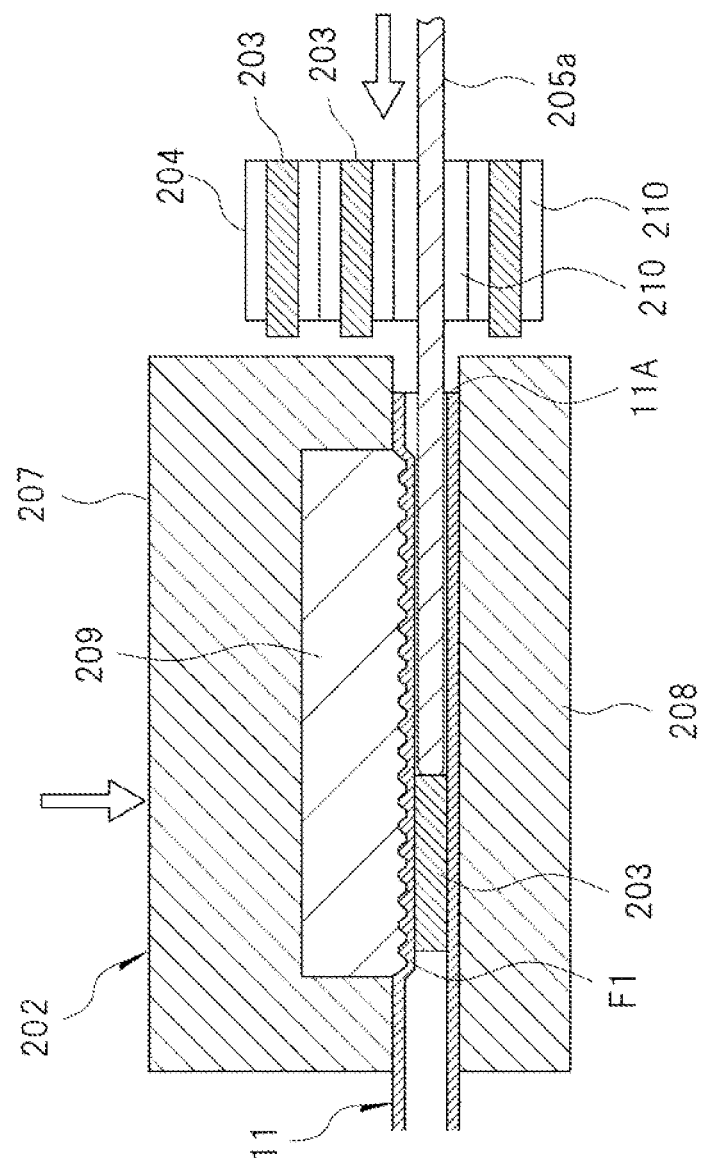
FIG. 13 is another enlarged view of the teeth forming machine, illustrating a step of forming teeth on the shaft member.

First, as shown in FIG. 13, the shaft member 11 is set in the die 202 so that the first end opening 11A of the shaft member 11 is directed toward the mandrel holder 204, and the first flat surface F1 is disposed to face the molding surface of the teeth die 209 attached to the upper die 207, and the shaft member 11 is sandwiched by the upper die 207 and the lower die 208 of the die 202.

Then, the first push rod 205a is driven by the first drive unit 206a, and one of the plurality of mandrels 203 housed in the mandrel holder 204 is press-fitted into the shaft member 11 through the first end opening 11A of the shaft member 11. The mandrel 203 is press-fitted across the entire length of the first flat surface F1.

Figure 14:
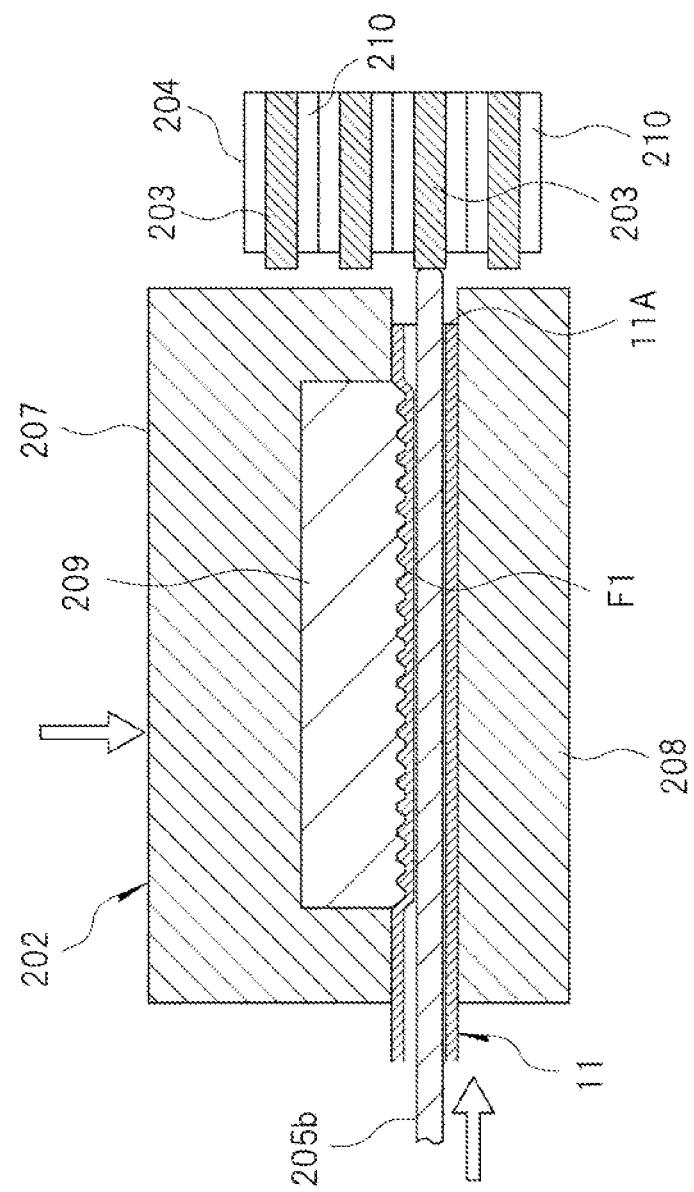
FIG. 14 is another enlarged view of the teeth forming machine, illustrating the forming of the teeth on the shaft member.

Subsequently, as shown in FIG. 14, the second push rod 205b is driven by the second drive unit 206b, and inserted into the shaft member 11 through the second end opening 11B of the shaft member 11. The mandrel 203 press-fitted into the shaft member 11 is pushed back by the second push rod 205b, ejected from the shaft member 11 through the first end opening 11A of the shaft member 11, and housed again in the holding chamber 210 of the mandrel holder 204. In this way, in the course of reciprocatory movement of the mandrel 203 over the entire length of the first flat surface F1, the material of the first flat surface F1 of the shaft member 11 pressed against the molding surface of the teeth die 209 is plastically deformed by the mandrel 203 toward the teeth die 209.

The mandrel 203 to be press-fitted into the shaft member 11 is replaced each time with a larger one selected from the plurality of mandrels 203 housed in the mandrel holder 204, and by repeating reciprocatory movement of the mandrel 203 over the entire length of the first flat surface F1, the material of the shaft member 11 at the first flat surface F1 of the shaft member 11 plastically deforms toward the teeth die 209 and gradually enters into the molding surface of the teeth die 209, and a teeth profile formed on the molding surface is transferred to form rack teeth of the first rack 20.

Second Teeth Forming

Figure 15:
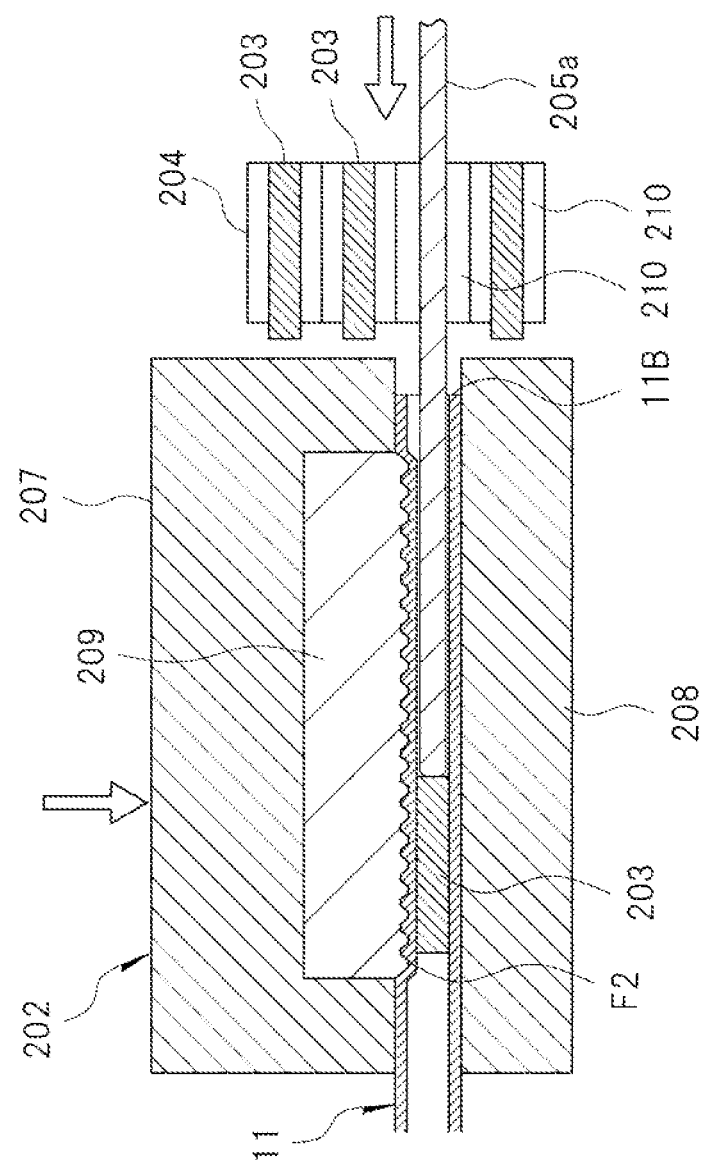
FIG. 15 is another enlarged view of the teeth forming machine, illustrating the forming of the teeth on the shaft member.

Next, the die 202 is opened once, and as shown in FIG. 15, the shaft member 11 is set in the die 202 so that the second end opening 11B of the shaft member 11 is directed toward the mandrel holder 204, and the second flat surface F2 is disposed to face the molding surface of the teeth die 209 attached to the upper die 207, and the shaft member 11 is sandwiched by the upper die 207 and the lower die 208 of the die 202.

Then, the first push rod 205a is driven by the first drive unit 206a, and one of the plurality of mandrels 203 housed in the mandrel holder 204 is press-fitted into the shaft member 11 through the second end opening 11B of the shaft member 11. The mandrel 203 is inserted across the entire length of the second flat surface F2.

Figure 16:
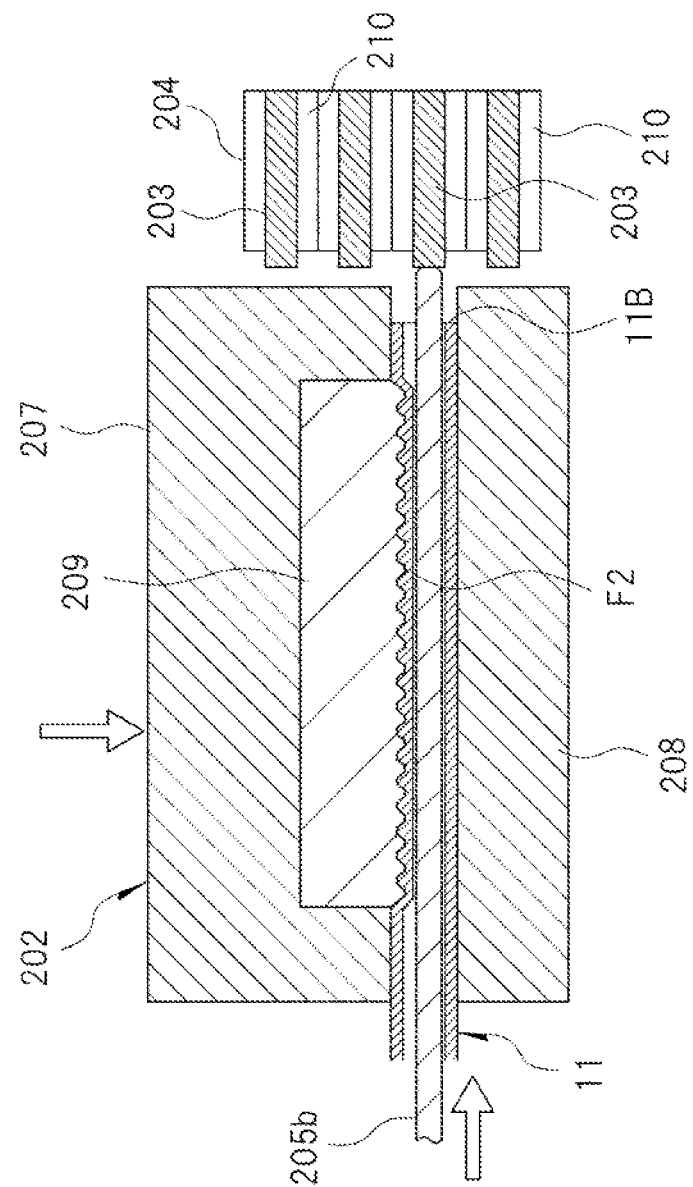
FIG. 16 is another enlarged view of the teeth forming machine, illustrating the forming of the teeth on the shaft member.

Subsequently, as shown in FIG. 16, the second push rod 205b is driven by the second drive unit 206b, and inserted into the shaft member 11 through the first end opening 11A of the shaft member 11. The mandrel 203 press-fitted into the shaft member 11 is pushed back by the second push rod 205b, ejected from the shaft member 11 through the second end opening 11B of the shaft member 11, and housed again in the holding chamber 210 of the mandrel holder 204. In this way, in the course of reciprocatory movement of the mandrel 203 over the entire length of the second flat surface F2, the material of the shaft member 11 at the second flat surface F2 of the shaft member 11 pressed against the molding surface of the teeth die 209 is plastically deformed by the mandrel 203 toward the teeth die 209.

The mandrel 203 to be press-fitted into the shaft member 11 is replaced each time with a larger one selected from the plurality of mandrels 203 housed in the mandrel holder 204, and by repeating reciprocatory movement of the mandrel 203 over the entire length of the second flat surface F2, the material of the second flat surface P2 of the shaft member 11 plastically deforms toward the teeth die 209 and gradually enters into the molding surface of the teeth die 209, and a teeth profile formed on the molding surface is transferred to form rack teeth of the second rack 21.

In the first teeth forming step, the plurality of mandrels 203 and the teeth die 209 corresponding to the teeth profile of the rack teeth of the first rack 20 are used. In the second teeth forming step, the plurality of mandrels 203 and the teeth die 209 corresponding to the teeth form of the rack teeth of the second rack 21 are used. The first teeth forming step and the second teeth forming step are performed one after the other. That is, the first teeth forming step may be performed first, or the second teeth forming step may be performed first.

According to the method for manufacturing the rack bar 10 described above, the angular positional difference θ between the first flat surface F1 formed through the first preliminary molding step and the second flat surface P2 formed through the second preliminary molding step is set with high accuracy. Accordingly, the angular positional difference between the first rack 20 formed on the first flat surface F1 through the first teeth forming step and the second rack 21 formed on the second flat surface P2 through the second teeth forming step is also highly accurate.

Since the rack bar 10 having the highly accurate angular positional difference between the first rack 20 and the second rack 21 can be formed from a single hollow shaft member 11, it has lighter weight than a rack bar formed from an entirely solid shaft member or a rack bar formed from a partially hollow shaft member. In addition, productivity can be improved as compared with a rack bar formed by joining two shaft members each having individually formed rack teeth.

This application is based on Japanese Patent Application No. 2017-051737 filed on Mar. 16, 2017, the entire content of which is incorporated herein by reference.

The invention claimed is:

1. A method for manufacturing a rack bar having a first rack and a second rack provided away from each other in an axial direction, with an angular positional difference around an axis of the rack bar being provided between the first rack and the second rack, the method comprising:

forming a first flat surface extending in the axial direction on an outer circumference of a first end portion of a single hollow shaft member;

forming a second flat surface extending in the axial direction on an outer circumference of a second end portion of the single hollow shaft member at a location having the angular positional difference with respect to the first flat surface;

forming the first rack by press-fitting a mandrel into the single hollow shaft member through a first opening of the single hollow shaft member on a side of the first end portion of the single hollow shaft member in a state in which a teeth die corresponding to the first rack is pressed against the first flat surface to cause a material of the single hollow shaft member at the first flat surface to plastically deform toward the teeth die; and forming the second rack by press-fitting the same mandrel or a different mandrel into the single hollow shaft member through a second opening of the single hollow shaft member on a side of the second end portion of the single hollow shaft member in a state in which the same teeth die or a different teeth die corresponding to the second rack is pressed against the second flat surface to cause a material of the single hollow shaft member at the second flat surface to plastically deform toward the same teeth die or the different teeth die, wherein the forming of the second flat surface comprises flattening the second end portion of the single hollow shaft member by a flat molding surface of a press die, and wherein the flattening of the second end portion comprises holding the single hollow shaft member in a state in which a positioning surface of a jig is brought into contact with the first flat surface, the positioning surface being arranged to be inclined with respect to the flat molding surface of the press die by a predetermined angle equivalent to the angular positional difference.

2. The method according to claim 1, wherein the jig includes a first jig and a second jig, the first jig having a reference surface arranged perpendicular to the flat molding surface of the press die, and the second jig having the positioning surface and a contact surface arranged to contact the reference surface, and wherein the positioning surface of the second jig is arranged to be inclined with respect to the flat molding surface of the press die by the predetermined angle by bringing the contact surface of the second jig into contact with the reference surface of the first jig.

\* \* \* \* \*